United States Patent [19]

Komuro et al.

[11] Patent Number: 4,760,331
[45] Date of Patent: Jul. 26, 1988

[54] SPECTRUM DISPLAY DEVICE

[75] Inventors: Fumio Komuro; Sadao Takahashi, both of Katsuta, Japan

[73] Assignee: Hitachi, Ltd., Tokyo, Japan

[21] Appl. No.: 292,803

[22] Filed: Aug. 14, 1981

[30] Foreign Application Priority Data

Sep. 1, 1980 [JP] Japan .................................. 55-119803

[51] Int. Cl.$^4$ ............................................ G01R 13/20
[52] U.S. Cl. ................................................. 324/121 R
[58] Field of Search ................... 324/121 R; 250/281; 340/703, 721; 73/23.1; 358/106, 107; 356/393, 394

[56] References Cited

U.S. PATENT DOCUMENTS

| | | | |
|---|---|---|---|
| 2,525,675 | 10/1950 | Heller | 324/121 R |
| 3,555,172 | 1/1971 | Heinz | 358/106 |
| 3,916,439 | 10/1975 | Lloyd et al. | 358/106 |
| 3,987,241 | 10/1976 | Lloyd et al. | 358/106 |

Primary Examiner—Stewart J. Levy
Attorney, Agent, or Firm—Antonelli, Terry & Wands

[57] ABSTRACT

A spectrum display device for displaying in colors a spectrum obtained by a scientific instrument such as a mass spectrometer in which video signals for producing two colors are supplied to a color display device such as a CRT, for example, a video signal for producing a red color contains information with respect to a first spectrum and a video signal for producing a blue color contains information with respect to a second spectrum, and therefore a region on a display face where the first and second spectra coincide with each other assumes a magenta color when the video signal for producing the red color and the video signal for producing the blue color are simultaneously supplied to the color display device. Accordingly, this spectrum display device makes it possible to perceive the degree of coincidence between the two spectra by a mixed color and to perceive a difference between the two spectra by the two original colors.

14 Claims, 8 Drawing Sheets

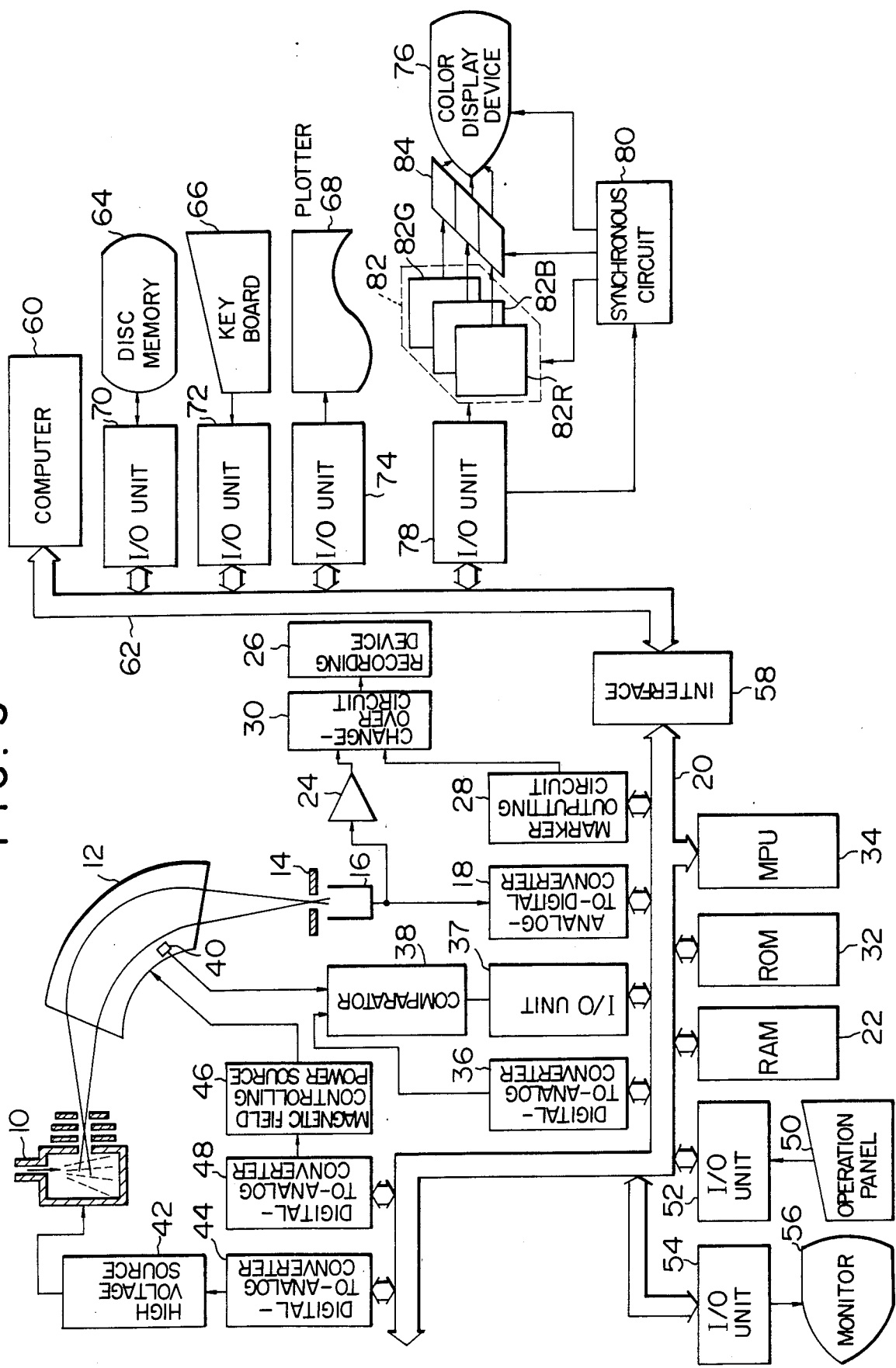

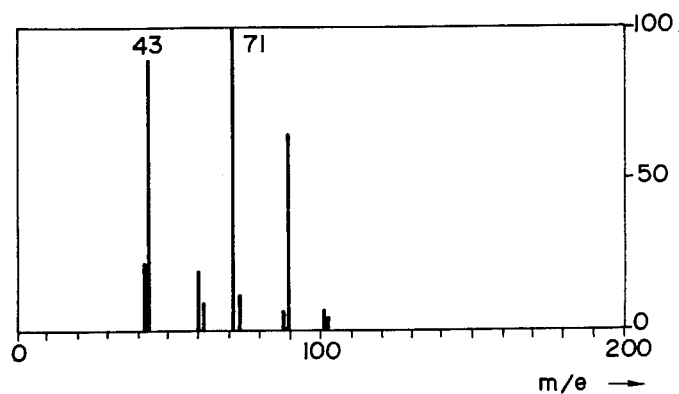
FIG. 4A
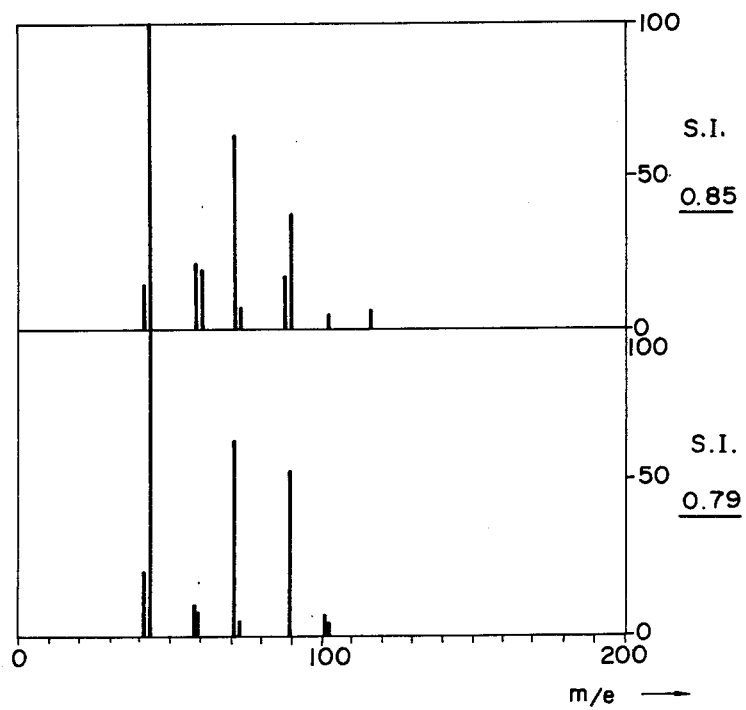
FIG. 4B
FIG. 4C

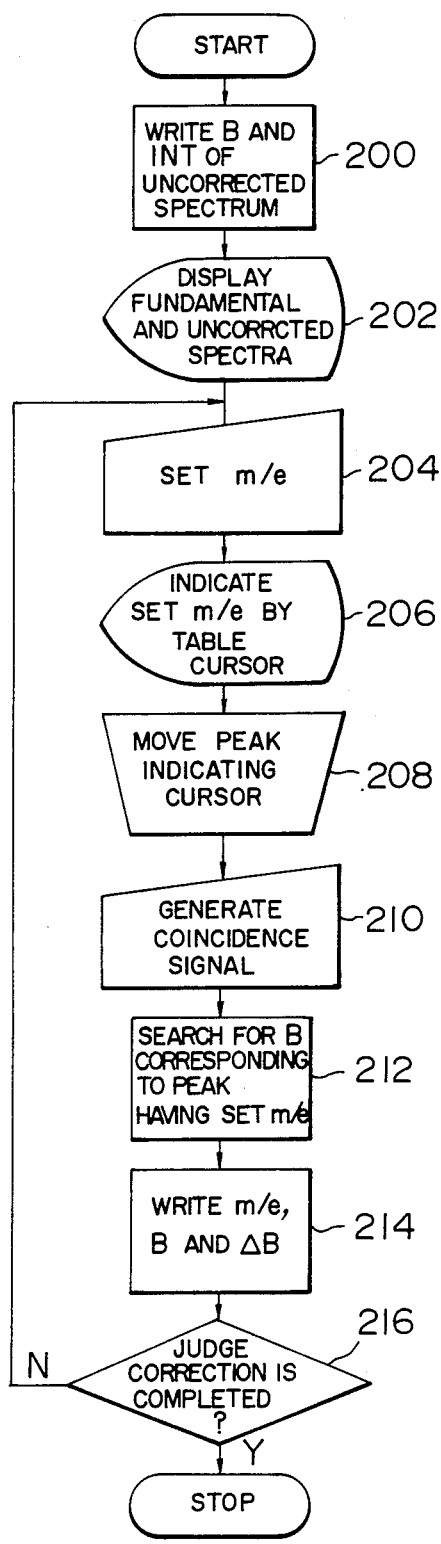

SPECTRUM DISPLAY DEVICE

BACKGROUND OF THE INVENTION

The present invention relates to a spectrum display device.

Spectrum is obtained as the result of analysis made by an analytical instrument. There are known various spectra such as an absorption spectrum and reflection spectrum obtained by a spectrophotometer, a mass spectrum obtained by a mass spectrometer, a nuclear magnetic resonance spectrum obtained by a nuclear magnetic resonance spectrometer, a chromatogram obtained by a gas chromatograph or liquid chromatograph, and an X-ray spectrum obtained by an X-ray analyzer. These spectra are usually expressed two-dimensionally. In these spectra, a variable indicating a predetermined physical quantity is plotted along the abscissa and another variable indicating a second physical quantity along the ordinate. Usually, these spectra are used in the qualitative analysis of a sample. Further, these spectra may be used in quantitative analysis or for other purposes. A recorder is generally employed to obtain a two-dimensional spectrum. In recent years, however, such a display device as a cathode ray tube is often employed.

SUMMARY OF THE INVENTION

The present invention has been made under the above-mentioned circumstances.

An object of the present invention is to provide a spectrum display device in which spectra are displayed in colors and chromatic characteristics are utilized to provide a novel display system.

According to the present invention, video signals for displaying first and second spectrum areas in different colors are supplied to a color display device, thereby attaining color spectra display.

When displayed on the recording medium of a recorder, an ordinary spectrum is comprised of a line spectrum arranged in a two-dimensional space. When the ordinate of the display space indicates a range from 0% to 100%, the 0% line or 100% line forms the base line. An area between the above-mentioned line spectrum and the base line (for example, the 0% line) is herein referred to as a spectrum area.

DESCRIPTION OF THE DRAWINGS

FIG. 3 is a block diagram showing an embodiment of a spectrum display device according to the present invention.

FIGS. 4A to 4C are spectrum charts for explaining an example of data retrieval.

FIG. 8 is a flow chart of the mass marker correction.

FIG. 9 is an explanatory view of a table for the correction of mass markers.

DESCRIPTION OF THE PREFERRED EMBODIMENTS

Figure 1:
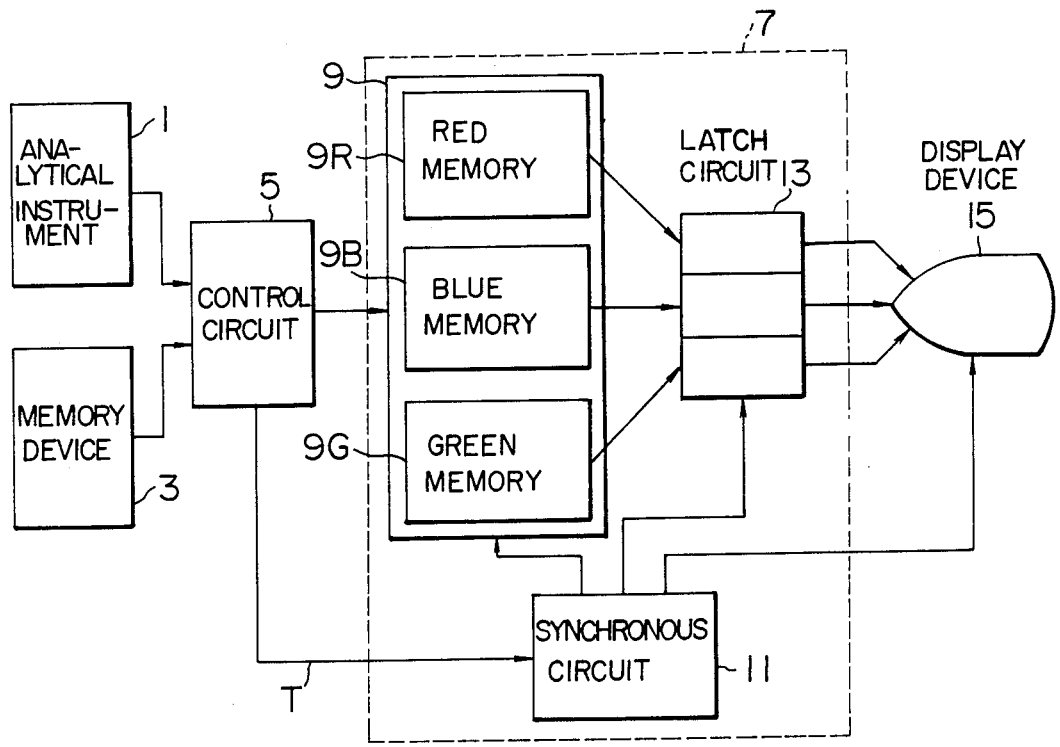
FIG. 1 is a block diagram for explaining the outline of the present invention.
Figure 2:
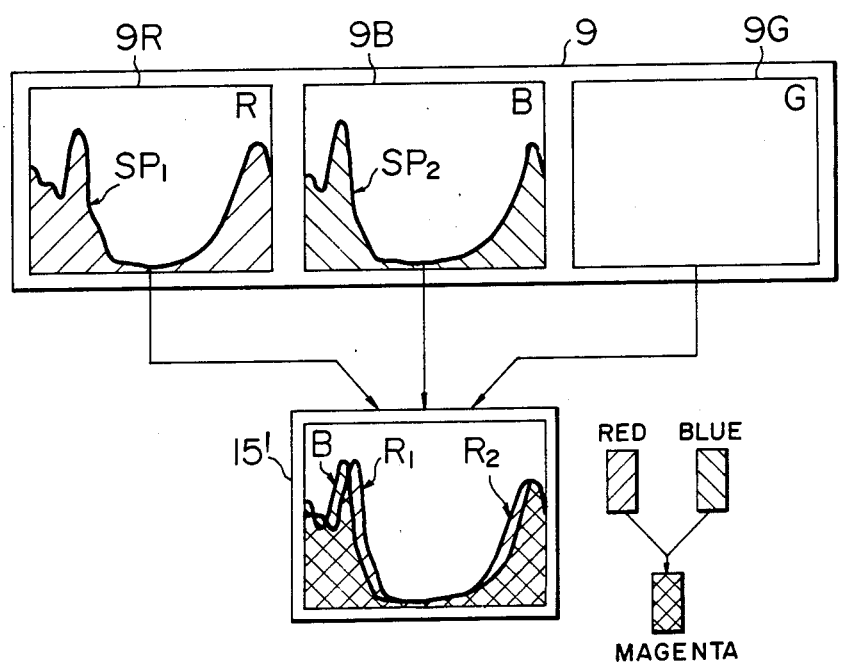
FIG. 2 is an explanatory view for showing spectrum data in the memory and display device shown in FIG. 1.

A fundamental concept of the present invention will be first explained with reference to FIGS. 1 and 2. A spectrum to be displayed is obtained in two methods. In the first method, the spectrum is obtained directly from an analytical instrument 1. While, in the second method, a spectrum previously obtained by another analytical instrument is stored as data in a memory device 3. As examples of storing data, one example provides for data extracted from a continuous spectrum at a predetermined interval to be stored in a memory. Another example is a bar graph representation of a spectrum in which spectrum peaks corresponding to the correlated mass numbers are stored. Some of recent analytical instruments include a microcomputer, and the spectrum obtained is temporarily stored in a random access memory (RAM) of the microcomputer. This case is considered to be the first method. A control circuit 5 reads two spectra out of the analytical instrument 1 and memory device 3 to set two spectrum area information in a picture memory 9 of a picture signal output circuit 7. In more detail, the control circuit 5 sends a trigger signal T to a synchronous circuit 11, and then transfers a picture signal to the picture memory 9. The synchronous circuit 11 delivers a synchronizing signal on the basis of the trigger signal to successively specify addresses of the picture memory 9 and to successively store the transferred signal in the memory 9 at the specified addresses. The picture memory 9 is made up of three memories, that is, a red memory 9R, a blue memory 9B and a green memory 9G. Each of these memories 9R, 9B and 9G has a memory capacity corresponding to the number of display points on the face of a display device 15. For example, when the display face includes 512×480 dots, each memory has a memory capacity corresponding to the above-mentioned number of dots. When a spectrum is displayed on the display face of the display device 15, the addresses of the picture memory 9 are successively specified by the synchronous signal from the synchronous circuit 11 to read out the picture signal. The picture signal thus read out is once held in a latch circuit 13, and then supplied to the display device 15. On the other hand, the display device 15 is supplied with a horizontal synchronizing signal and a vertical synchronizing signal from the synchronous circuit 11 to display the spectrum on the face of the display device 15. In this case, two spectrum areas are stored in terms of the picture signals in the picture memory 9. An example of the storing condition in the picture memory 9 is shown in FIG. 2. That is, where first and second spectrum areas to be displayed are indicated by SP1 and SP2, respectively, first spectrum area information SP1 is stored in the red memory 9R and second spectrum area information SP2 is stored in the blue memory 9B. Although each information shown in FIG. 2 is expressed in an analog fashion, it is in fact stored in a digital fashion. When the first spectrum area SP1 and the second spectrum area SP2 are placed side by side as shown in the upper part of FIG. 2 and compared with each other, it is apparent that they resemble each other very well. However, in order to know parts in which the two spectrum areas are different from each other, a multiplicity of comparisons are needed therebetween and thus it is impossible to immediately perceive differences between them. On the other hand, when the first spectrum area information SP1 stored in the red memory 9R and the second spectrum area information SP2 stored in the blue memory 9B are displayed on the face of the display device 15, a pattern is obtained as shown in the lower part of FIG. 2. In FIG. 2, reference numeral 15' designates a spectrum pattern which is displayed on the face of the display device 15 and can be perceived by the eye. In the pattern 15', a region where the first spectrum area SP1 (assuming a red color) and the second spectrum area SP2 (assuming a blue color) coincide with each other, assumes a magenta color on the basis of the principle of color mixing. On the other hand, regions where the two spectrum areas do not coincide with each other, are left unchanged, that is, assume a red or blue color. Accordingly, a deviation of a peak R1 of the first spectrum area SP1 from a peak B of the second spectrum area SP2 in the transverse direction, such as shown in a left part of the pattern 15', can be readily recognized. Further, the fact that a peak R2 of the first spectrum area SP1, as shown in a right part of the pattern 15', is greater in width than a corresponding peak of the second spectrum area SP2, can also be readily perceived. Further, the degree of coincidence between the two spectrum areas can be known immediately from a ratio of the magenta region to the total region including the red, blue and magenta regions, or a ratio of the region assuming a mixed color to the regions assuming original colors.

In the foregoing explanation, the first spectrum area information and the second spectrum area information are stored in the red memory 9R and blue memory 9B, respectively, and the overlapping region in the pattern 15' is displayed in magenta. However, other combinations of colors may be employed. For example, the red memory and the green memory are employed so that the overlapping region is displayed in yellow which is the mixture of red and green, or the green memory and the blue memory are employed so that the overlapping region is displayed in cyan which is the mixture of green and blue. Furthermore, all of the three memories can be effectively employed. That is, a picture signal indicating the first spectrum area is stored in the blue memory 9B, and a picture signal indicating the second spectrum area is stored simultaneously in the red memory 9R and green memory 9G. As a result, the first spectrum area is displayed on the face of the display device 15 in blue, the second spectrum area is displayed in yellow, and the overlapping region of the first and second spectrum areas is displayed in white.

In the foregoing explanation, only two spectra are displayed on the face of the display device 15. However, characters, numerals, and the ordinate and abscissa of spectra can be displayed additionally through the conventional picture display technique.

Further, in the above-mentioned explanation, a monitor television receiver has been used as the display device 15. However, in the case where an ordinary television receiver is employed, after the horizontal synchronizing signal and vertical synchronizing signal generated from the synchronous circuit 11 are combined with the picture signal in the picture memory 9, the combined signal is used to carry out RF modification for a VHF wave and then the modified VHF wave is applied to the antenna terminal of the television receiver to display spectra on the face of the television receiver.

Further, the foregoing explanation has been made for the case where a three electron gun color CRT is employed. However, a single electron gun color CRT can also be used by changing somewhat the method of controlling the picture signal. Further, color display devices other than CRT's may be employed.

Now, an embodiment of the present invention will be explained with reference to FIG. 3. In this embodiment, a mass spectrum obtained by a mass spectrometer is displayed. A first, explanation will be made on the general construction and operation of the mass spectrometer. In this mass spectrometer, a microcomputer controls the mass spectrometer itself and performs arithmetic operations for a signal from the mass spectrometer. A sample, which is introduced into an ion source 10 from a gas chromatograph or by a sample introduction mechanism, is ionized in the ion source 10. The ions thus formed are drawn out of the ion source 10 and are then accelerated by an accelerating voltage applied betewen electrodes. The accelerated ions are introduced into a magnetic field established in the pole gap of a pair of magnets 12, and are dispersed in accordance with their mass number. Only the ions having a mass number corresponding to the intensity of the magnetic field reach a detector 16 through a collector slit 14. The output of the detector 16 is converted by an analog-to-digital converter 18 into a digital signal, which is sent through a bus line 20 to a random access memory (RAM) 22 and stored therein. Further, the output of the detector 16 is amplified by an amplifier 24, and is then recorded by a recording device 26 such as a visigraph or a UV recorder. A marker outputting circuit 28 delivers a short marker signal for each mass number, delivers a marker signal having an intermediate duration each time the mass number is increased by 10, and delivers a long marker signal each time the mass number is increased by 100. The output of the amplifier 24 and the output of the marker outputting circuit 28 are selectively applied through a changeover circuit 30 to the recording device 26. Thus, a mass spectrum and mass markers are recorded on a recording medium of the recording device 26. The marker signals outputted from the marker outputting circuit 28 are formed in the following manner. That is, a table indicating the correspondence of mass number to magnetic field intensity is previously stored in RAM 22 or in a read only memory (ROM) 32. A microcomputer (MPU) 34 reads out a magnetic field intensity corresponding to a predetermined mass number, from the above-mentioned table. The intensity value thus read out is converted by a digital-to-analog converter 36 into an analog signal, which is applied to a comparator 38 at one input terminal thereof. A magnetic field detecting element 40 such as a Hall element is placed in the pole gap of the magnets 12. A signal indicating the field intensity detected by the magnetic field detecting element 40 is applied to the comparator 38 at the other input terminal thereof. When the two signals applied to the comparator 38 become equal to each other, that is, when the intensity of the magnetic field established across the pole gap of the magnets 12 becomes equal to the magnetic field intensity corresponding to the predetermined mass number, the comparator 38 delivers a coincidence signal. An interrupt I/O unit 37 delivers an interrupt signal on the basis of the coincidence signal. When supplied with the interrupt signal, MPU 34 confirms the mass number at this time and causes the marker outputting circuit 28 to output a marker signal. The accelerating voltage employed in the ion source 10 is adjusted in a high voltage source 42, and the high voltage source 42 is controlled by MPU 34 through a digital-to-analog converter 44. A magnetic field controlling power source 46 supplies power to the magnets 12 to establish a magnetic field across the pole gap of the magnets 12. The power source 46 is controlled by MPU 34 through a digital-to-analog converter 48. A scanning mode, a mass range to be measured, and a scanning speed are set by an operation panel 50 through an I/O unit 52. A mass spectrum and peaks are displayed on a monitor 56 through an I/O unit 54. The above-mentioned parts, circuits and elements make up the mass spectrometer.

Further, the bus line 20 is connected through an interface 58 to a bus line 62 of a computer (CPU) 60, which is far greater in processing capability than MPU 34. The computer 60 is used mainly for data processing. Both a program for data processing and data indicating the results of operation are stored in a disc memory 64. Various conditions are inputted from and set by a key board 66. The results of data processing are printed out by a plotter 68. The disc memory 64, key board 66 and plotter 68 are connected to the bus line 62 through I/O units 70, 72 and 74, respectively. Further, the results of data processing can also be displayed by a color display device 76 such as a color CRT. The color display device 76 is connected to the bus 62 through an I/O unit 78. The synchronous circuit 80 controls write-in and read-out operations for a red memory 82R, blue memory 82B and green memory 82G, which are included in a picture memory 82. The picture signal read out of the picture memory is once held by a latch circuit 82 and is then supplied to the color display device 76. The synchronous circuit 80 delivers horizontal and vertical synchronizing signals.

Next, explanation will be made on an example of the case where spectra are displayed in colors by means of the embodiment shown in FIG. 3.

Figure 5:
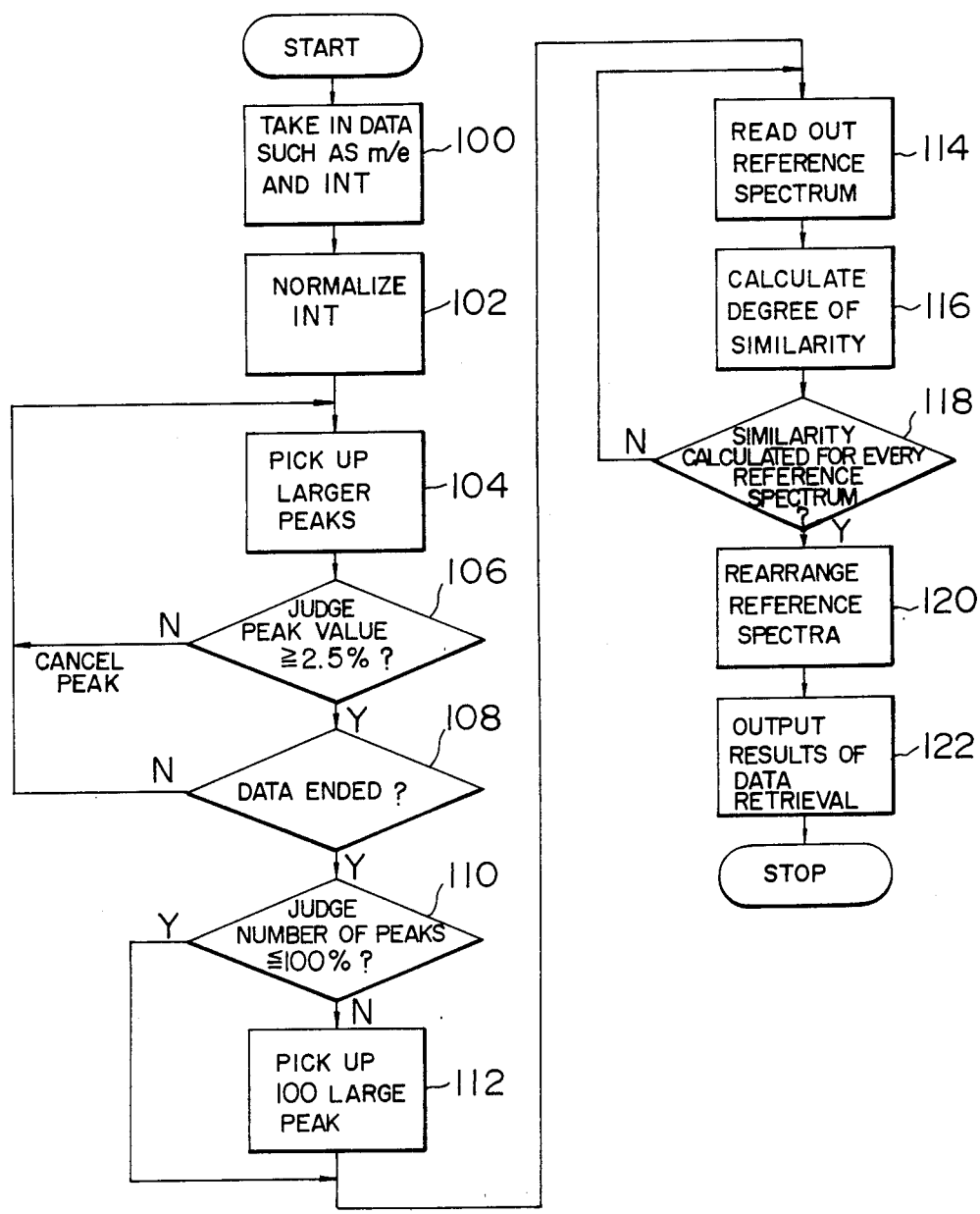
FIG. 5 is a flow chart of the data retrieval.

FIGS. 4A to 4C show spectra with respect to data retrieval. That is, FIG. 4A shows a spectrum to be identified, and FIGS. 4B and 4C show spectra which are selected by data retrieval from a library and are similar to the spectrum shown in FIG. 4A. The spectrum shown in FIG. 4B is superior in degree of similarity to the spectrum shown in FIG. 4C. Now, the outline of data retrieval will be explained with reference to FIGS. 3 and 5. When such measuring conditions as an accelerating voltage and a scanning mass range are inputted at the operation panel 50, the high voltage source 42 is set so as to generate a predetermined accelerating voltage, and an unknown sample is introduced into the ion source 10 to be ionized. The ions from the ion source 10 are subjected to mass dispersion by the action of the scanning magnetic field produced by the magnetic field controlling source 46, and are then detected by the detector 16. The output of the detector 16 is converted by the analog-to-digital converter 18 into a digital signal, namely, an ion intensity signal INT. The ion intensity signal is made to correspond to a mass number m/e. Ion intensity signals and mass numbers corresponding thereto are temporarily stored in RAM 22. In step 100, CPU 60 takes in the mass numbers m/e and ion intensity signals INT stored in RAM 22, through the interface 58. In step 102, the value of each ion current indicated along the ordinate of the mass spectrum is converted into a ratio of this value to the largest ion current, that is, each ion intensity signal supplied to CPU 60 is normalized. In step 104, the abscissa of the mass spectrum is divided into a plurality of intervals each including 14 mass numbers, and two larger peaks are picked up at each interval. In step 106, it is judged whether the peak value of each picked-up peak is not less than 2.5% of full scale or not, and small peaks having a peak value less than 2.5% are cancelled. In step 108, it is judged whether the processing in steps 104 and 106 has been completed at every interval or not. After the processing in steps 104 and 106 has been carried out for every interval, the processing in step 110 is performed. In step 110, it is judged whether the number of peaks remaining as the large peaks is not more than 100 or not. When the number of remaining peaks is greater than 100, 100 large peaks are selected in the order of peak height in step 112. Thus, the mass spectrum to be identified is simplified. Then, in step 114, a reference spectrum is read out of a library, which is contained in the magnetic disc 64. The reference spectrum has been normalized and simplified in the same manner as the mass spectrum to be identified, and is formed of mass numbers and ion current values corresponding thereto. In addition to the mass numbers and ion current values, the name, molecular weight, molecular formula and ionization process of a compound producing the reference spectrum are stored in the library. In step 116, the degree of similarity is calculated between the reference spectrum read out of the library and the spectrum to be identified. The calculation is carried out in such a manner that a ratio of the pattern coefficient of the reference spectrum to that of the spectrum to be identified is calculated for each mass number and then a standard deviation of the pattern coefficient ratios thus obtained is calculated. Incidentally, the pattern coefficient indicates a ratio of the height of each peak of a mass spectrum to the height of the largest peak. When a ratio between pattern coefficients is calculated, the ratio has a positive or negative value, or a negative or positive value according to whether the peak of the reference spectrum is greater than the peak of the spectrum to be identified or not. The degree of similarity between the two spectra is great as the standard deviation is smaller. When the absolute value of the mean of the pattern coefficient ratios is used as a weight We and the standard deviation of the pattern coefficient ratios is indicated by S(X), the degree of similarity S.I. is expressed by the following equation:

$$S.I. = 1 - We \cdot S(X)$$

Accordingly, when the two spectra are entirely coincident with each other, the degree of similarity S.I. becomes equal to 1.0. The degree of similarity is close to 1.0 as the two spectra are more similar to each other. When the degree of similarity S.I. is less than 0.4, the two spectra scarcely resemble each other in shape. In step 116, the degree of similarity is calculated for one reference spectrum in the above-mentioned manner. In step 118, it is judged whether the degree of similarity has been calculated for every reference spectrum in the library or not. After the degree of similarity has been obtained for every reference spectrum, the reference spectra are rearranged in the order of degree of similarity (step 120). In step 122, the results of data retrieval are outputted to the display device 76 or plotter 68.

Figure 6A:
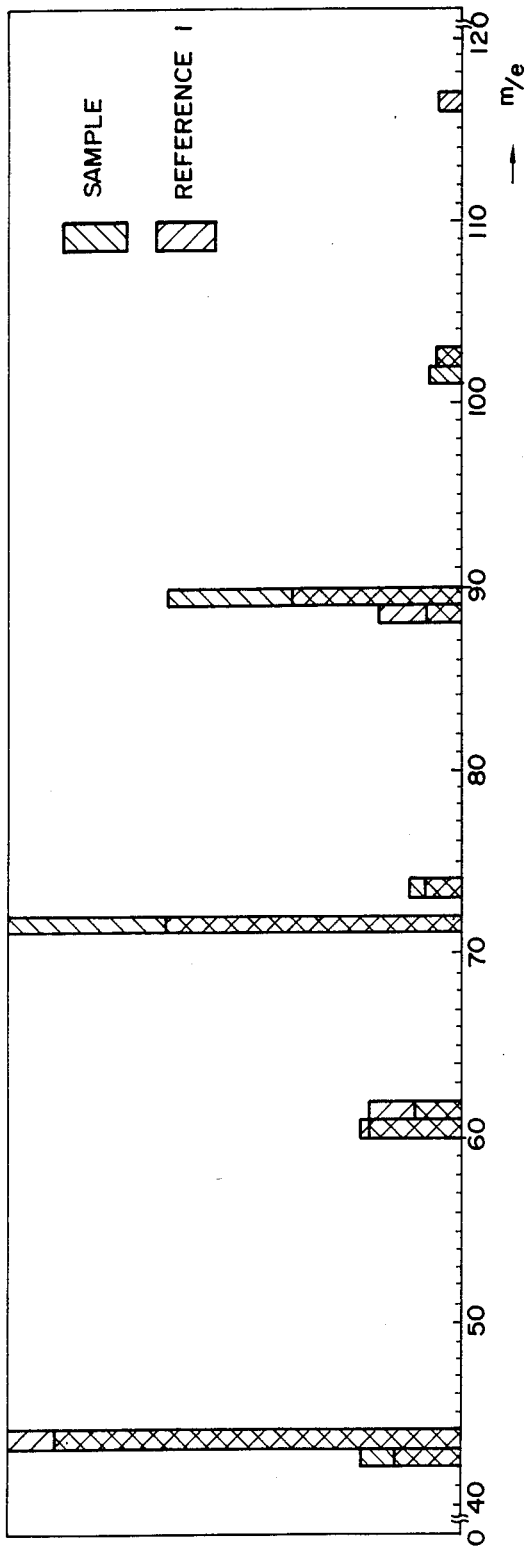
FIGS. 6A and 6B are spectrum charts according to the present invention for showing spectra obtained by the data retrieval.
Figure 6B:
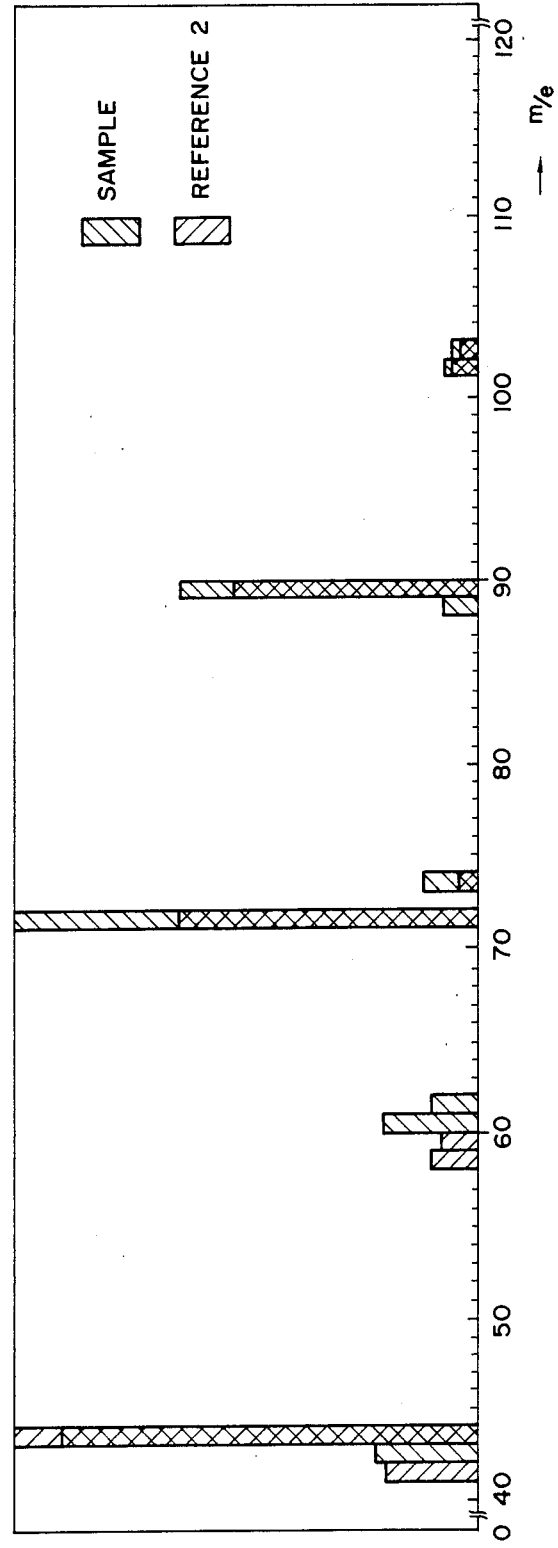

In the above-mentioned method for data retrieval, the library is searched for spectra which are similar to the spectrum shown in FIG. 4A. As a result of the above search, the spectra shown in FIGS. 4B and 4C are obtained. When the three spectra are arranged as shown in FIGS. 4A, 4B and 4C, it is impossible to known immediately the similarity of the spectra shown in FIGS. 4B and 4C to the spectrum shown in FIG. 4A. Therefore, the similarity is known by the degree of similarity S.I. which is obtained by calculation. On the other hand, FIGS. 6A and 6B show spectrum patterns displayed in accordance with the present invention. The spectrum to be identified is stored in the red memory 82R, and a reference spectrum obtained by data retrieval is stored in the blue memory 82B. Then, these spectra are displayed on the display face of the device 76. The results of data retrieval are stored in the magnetic disc 64 in such a manner that reference spectra are arranged in the order of degree of similarity. Accordingly, the reference spectrum stored in the blue memory 82B can be readily replaced. FIG. 6A shows the case where the reference spectrum shown in FIG. 4B is stored in the blue memory 82B and the spectrum shown in FIG. 4A is stored in the red memory 82R. FIG. 6B shows the case where the reference spectrum shown in FIG. 4C is stored in the blue memory 82B in place of the reference spectrum shown in FIG. 4B. In FIGS. 6A and 6B, portions where the spectrum of the sample and one of the reference spectra coincide with each other, assume a magneta color. It is known immediately from FIG. 6A that the two spectra resemble each other in a range having small mass numbers but corresponding peaks are shifted from each other in a range having large mass numbers. Further, it is known immediately from FIG. 6B that the two spectra are similar to each other in a range having large mass numbers but several peaks of the spectrum of the sample are a little shifted in mass number from corresponding peaks of the reference spectrum in a range having small mass numbers. It is very difficult to find such a small difference in mass number between two peaks when the two spectra are placed side by side. According to the present invention, this problem can be solved as shown in FIGS. 6A and 6B. Further, the previously-mentioned degree of similarity S.I. cannot show the degree of coincidence between a pair of corresponding peaks of the two spectra. There is a fear of a high degree of similarity being obtained when the two spectra resemble each other at peaks indicating fragment ions but are not similar to each other at a peak indicating a parent ion. According to the present invention, such a fear can be eliminated. Further, according to the present invention, when two peaks are present at the same mass number, it can be known at first sight that one of the peaks is higher than the other. For example, it can be readily seen from FIG. 6A that the reference peak (that is, the peak included in the reference spectrum) is higher than the sample peak (that is, the peak included in the spectrum of the sample) at mass number 88 but the reference peak is lower than the sample peak at mass number 89.

Now, another example of the case where spectra are displayed in colors in accordance with the present invention, will be explained with reference to FIGS. 7A, 7B, 8 and 9.

Figure 7A:
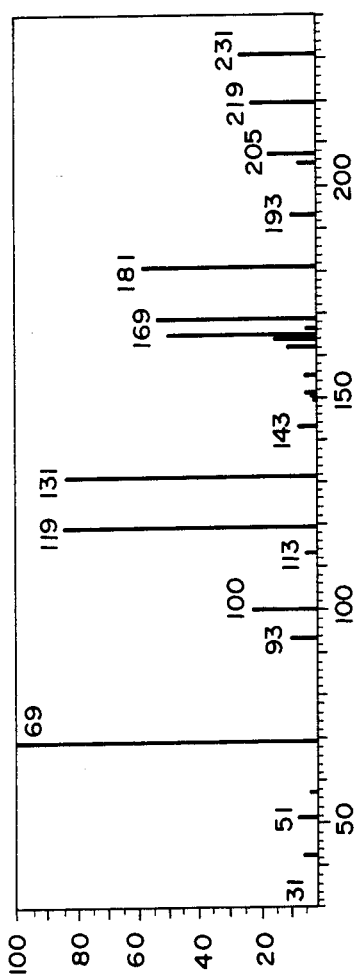
FIG. 7A and 7B are spectrum charts for explaining the correction of mass markers by the PFK mass spectrum.
Figure 7B:
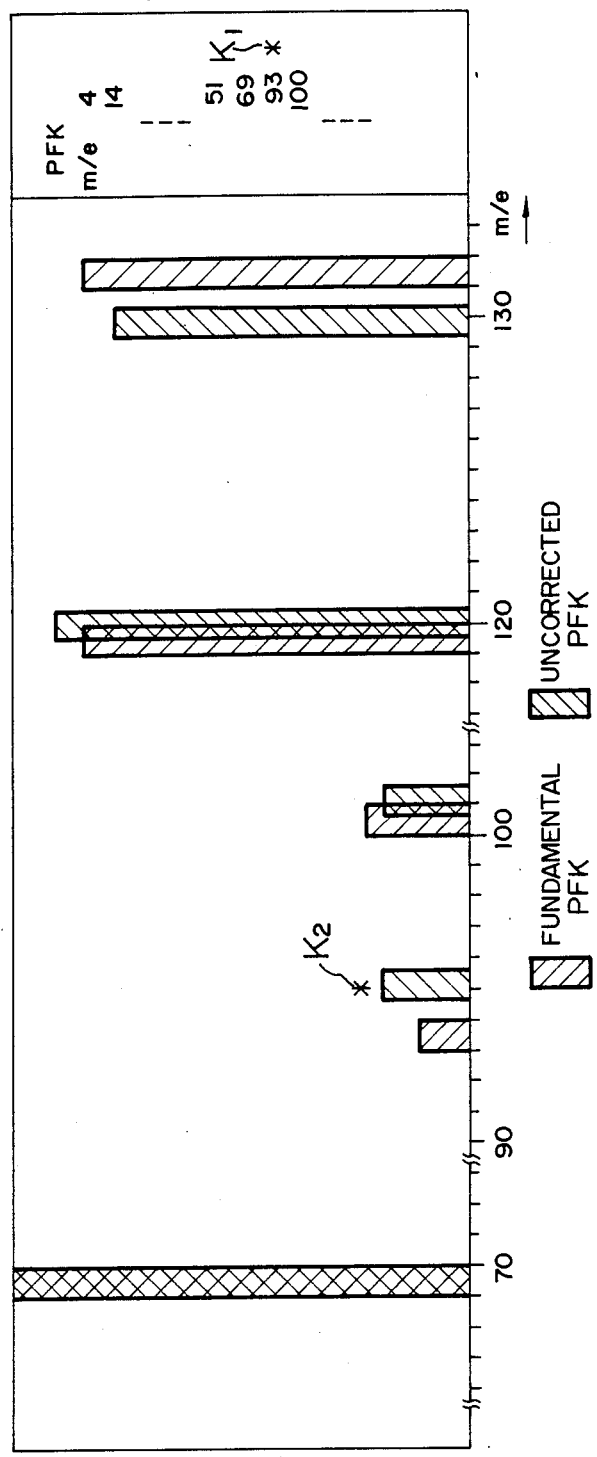

FIG. 7A shows a part of the mass spectrum of perfluorokerosene, which is a standard substance in mass spectrometry and is used to correct mass markers or to measure by an internal standard method. FIG. 7B shows a pattern displayed on the face of the display device 76 in the case where mass markers are corrected by means of the spectrum of perfluorokerosene (hereinafter referred to as "PFK"). Referring to FIG. 7B, a fundamental PFK spectrum is displayed in red, and an uncorrected PFK spectrum (that is, a spectrum to be corrected) is displayed in blue. The uncorrected PFK spectrum is obtained in such a manner that a predetermined accelerating voltage is applied to the ion source as well as the magnetic field is scanned increasingly. Referring to FIG. 8, the magnetic field and ion current are measured in the above process so that the magnetic field intensities B and the values of ion current INT corresponding to the uncorrected PFK spectrum are temporarily stored in the magnetic disc 64 (step 200). On the other hand, the magnetic disc 64 stores therein a fundamental table shown in FIG. 9. The fundamental table contains therein 128 mass numbers and corresponding magnetic field intensities. The 128 mass numbers include 29 mass numbers corresponding to 29 main peaks of PFK, and the remaining mass numbers interpolated between the mass numbers of the main peaks of PFK. In step 202, the main peaks of the fundamental PFK spectrum are displayed precisely along abscissa, which indicates mass number (m/e) in a linear scale. The main peaks of the uncorrected PFK spectrum are displayed along the abscissa, which indicates mass number (m/e) in uncorrected scale. FIG. 7B shows the fundamental and uncorrected spectra displayed in step 202. The fundamental PFK spectrum is displayed in red and the uncorrected PFK spectrum is displayed in blue. Accordingly, portions where the two spectra coincide with each other, assume a magenta color. Thus, it can be readily known from the change in colors whether the fundamental spectrum coincides with the uncorrected spectrum or not. Since two peaks having the same mass number are displayed in close proximity to each other, it is easy to know the mass number of each main peak of the uncorrected spectrum. Further, in the right part of the face of the display device 76 is displayed a mass number table which includes mass numbers of the main peaks of PFK and a cursor $K_1$ movable up and down on the right side of the mass numbers (see FIG. 7B). The mass numbers for the uncorrected PFK spectrum, that is, the mass markers for the uncorrected PFK spectrum are corrected in the order of mass number. In step 204, a mass number to be corrected is set. In step 206, the cursor $K_1$ is moved to the mass number, which is set in step 204, on the mass number table. For example, after the cursor $K_1$ has indicated a mass number 93, a peak indicating cursor $K_2$ is moved to a peak of the uncorrected spectrum which corresponds to the mass number 93 (step 208). When the cursor $K_2$ has reached the above-mentioned peak, a coincidence signal is generated (step 210). In step 212, CPU 60 reads on the basis of the coincidence signal the magnetic field intensity corresponding to the above-mentioned peak of the uncorrected spectrum out of the magnetic disc 64, which stores therein data with respect to the uncorrected spectrum. On the other hand, the magnetic disc 64 further includes an area for a correction table. The correction table includes main mass numbers, magnetic field intensities corresponding thereto, and differential coefficients in magnetic field intensity between adjacent main mass numbers (see FIG. 9). The magnetic field intensity corresponding to the peak having the mass number 93 is written in the correction table, together with the mass number 93 (step 214). In step 216, it is judged whether the processing in steps 206 to 204 has been performed for all of the main mass numbers or not. After the above processing has been performed for all of the main mass numbers, a magnetic field intensity corresponding to each mass number is calculated on the basis of the correction table. Further, a corrected spectrum is displayed on the face of the display device to find any error in correction. Such correction for mass markers is required when the scanning speed is changed, since the magnetic field is affected by eddy current. Further, such correction is also required on up-scan and down-scan because of hysteresis of the magnet. In these cases, the mass markers can be corrected in the above-mentioned manner.

Figure 10:
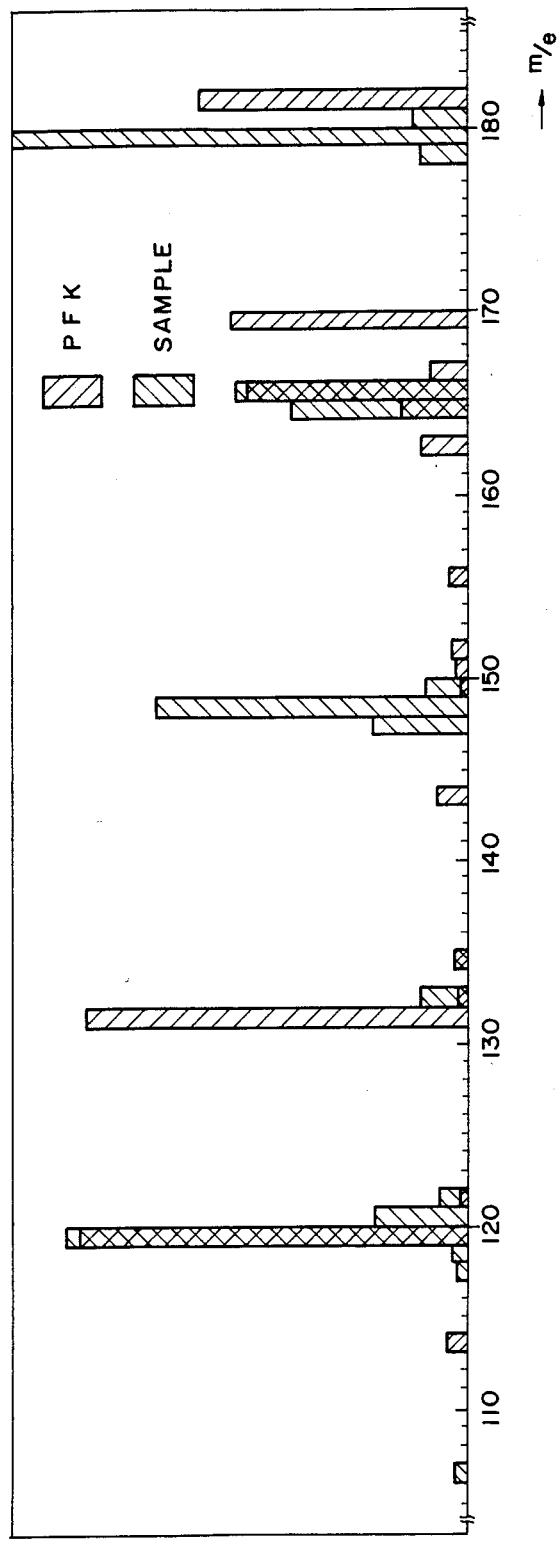
FIG. 10 is a spectrum chart of a mixture containing an internal standard.

A further example of the case where spectra are displayed in colors in accordance with the present invention, will be explained below with reference to FIG. 10. FIG. 10 shows mass spectra which are displayed on the face of the display device in the case where a milli-mass-analysis using an internal standard is carried out by a mass spectrometer. In this case, PFK is used as the internal standard, and the spectrum of a sample and the spectrum of PFK are displayed in red and blue, respectively, to readily know the mass number of each peak of the sample.

Further, when the spectrum of a sample containing a background component and the spectrum of only the background are displayed in different colors, respectively, it is possible to know at first sight the ratio of the spectrum of the background component to the measured spectrum or a spectrum of the sample.

In the foregoing description, the present invention has been explained with respect to mass spectra. However, when a spectrophotometer, a nuclear magnetic resonance spectrometer, a chromatograph and an X-ray analyzer are employed as the analytical instrument 1 shown in FIG. 1, various kinds of spectra are displayed which can be readily perceived by the eye.

As explained in the foregoing, the color display according to the present invention makes it possible to discriminate two spectra at first sight. For example, the coincidence or a difference between two spectra can be readily determined, and one of two spectra can be readily identified on the basis of the other spectra.

We claim:

1. A spectrum display device comprising a display surface, and means for displaying on said display surface a first spectrum in a first color and a second spectrum in a second color, respectively, in such a way that the first and second spectra are displayed in superposition with each other to form a composite display in which a mixed color is formed of the first and second colors in the area of said composite display where the first and second spectra are substantially equal to each other in intensity and substantially coincident with each other in position.

2. A spectrum display device according to claim 1, wherein said first color is one of three primary colors and said second color is another one of said three primary colors.

3. A spectrum display device according to claim 1, wherein said first color is one of three primary colors and said second color is a mixed color formed of the remaining two primary colors of said three primary colors.

4. A spectrum display device according to claim 1, wherein said first spectrum is a spectrum of an unknown sample, and wherein said second spectrum is a spectrum which is similar to said spectrum of said unknown sample and is obtained by data retrieval.

5. A spectrum display device according to claim 1, wherein said first spectrum is a fundamental spectrum of a known substance, and wherein said second spectrum is a spectrum which is obtained by analyzing a substance under a predetermined condition.

6. A spectrum display device according to claim 1, wherein said first spectrum is a spectrum of an internal standard substance, and said second spectrum is a spectrum of a sample.

7. A spectrum display device according to claim 1, wherein said first spectrum is a background spectrum, and said second spectrum is a spectrum of a sample.

8. A method for visually indicating the similarities and differences both in intensity and position of the component values of first and second spectra, comprising the steps of:
   displaying a first spectrum in a first color as a first display pattern of the component values of said first spectrum; and
   displaying a second spectrum in a second color as a second display pattern of the component values of said second spectrum in such a way that said second display pattern is in overlapping relationship and synchronized in display position to said first display pattern, so as to cause the overlapping display areas of the component values of said first and second spectra to appear in a third color formed of said first and second colors.

9. A method according to claim 8, wherein said first color is one of three primary colors and said second color is another one of said three primary colors.

10. A spectrum display device according to claim 8, wherein said first color is one of three primary colors and said second color is a mixed color formed of the remaining two primary colors of said three primary colors.

11. A method according to claim 8, wherein said first spectrum is a spectrum of an unknown sample, and wherein said second spectrum is a spectrum which is similar to said spectrum of said unknown sample and is obtained by data retrieval.

12. A method according to claim 8, wherein said first spectrum is a fundamental spectrum of a known substance, and wherein said second spectrum is a spectrum which is obtained by analyzing a substance under a predetermined condition.

13. A method according to claim 8, wherein said first spectrum is a spectrum of an internal standard substance, and said second spectrum is a spectrum of a sample.

14. A method according to claim 8, wherein said first spectrum is a background spectrum, and said second spectrum is a spectrum of a sample.

* * * * *